US008256815B2

(12) United States Patent  (10) Patent No.: US 8,256,815 B2
Tosco  (45) Date of Patent: Sep. 4, 2012

(54) RAISABLE LOAD SHELF FOR A LUGGAGE COMPARTMENT OF A MOTOR VEHICLE

(75) Inventor: Franco Tosco, Turin (IT)

(73) Assignee: Fiat Group Automobiles S.p.A. (IT)

( * ) Notice: Subject to any disclaimer, the term of this patent is extended or adjusted under 35 U.S.C. 154(b) by 347 days.

(21) Appl. No.: 12/615,129

(22) Filed: Nov. 9, 2009

(65) Prior Publication Data

US 2010/0116763 A1    May 13, 2010

(30) Foreign Application Priority Data

Nov. 11, 2008  (EP) .................................. 08425723

(51) Int. Cl.
B60R 5/04  (2006.01)
(52) U.S. Cl. ................................ 296/24.44; 296/37.16
(58) Field of Classification Search ............... 296/24.45, 296/24.44, 26.06, 37.16, 37.18, 97.12, 24.3, 296/191, 190.11; 160/234; 224/504; 108/44, 108/141, 143, 138, 147.2; B60N 3/00, 5/04
See application file for complete search history.

(56) References Cited

U.S. PATENT DOCUMENTS

| | | | | |
|---|---|---|---|---|
| 2,889,097 A * | 6/1959 | Broehl | .......................... | 224/542 |
| 3,162,416 A * | 12/1964 | Amarillas | ..................... | 248/244 |
| 3,291,520 A * | 12/1966 | Smith | ........................ | 296/24.44 |
| 3,393,936 A * | 7/1968 | Hall | ............................ | 296/24.44 |
| 3,516,369 A * | 6/1970 | Bidak et al. | ................... | 108/138 |
| 4,455,948 A * | 6/1984 | Torres | ............................ | 108/44 |
| 4,969,678 A * | 11/1990 | Loisel | ......................... | 296/24.33 |
| 5,598,962 A * | 2/1997 | Schlachter | ..................... | 224/542 |
| 5,669,537 A * | 9/1997 | Saleem et al. | ................. | 224/539 |
| 5,931,527 A * | 8/1999 | D'Onofrio et al. | ............ | 297/146 |
| 6,062,146 A * | 5/2000 | Conners et al. | ................. | 108/44 |
| 6,113,172 A * | 9/2000 | Chaloult et al. | ............ | 296/26.08 |
| 6,176,535 B1 * | 1/2001 | Chaloult et al. | ............ | 296/37.16 |
| 6,546,598 B1 * | 4/2003 | Nakanou et al. | ............. | 224/281 |
| 7,281,743 B2 * | 10/2007 | Weiland | ..................... | 296/24.44 |
| 7,401,716 B2 * | 7/2008 | Svenson et al. | ............ | 224/42.32 |
| 7,748,775 B2 * | 7/2010 | Mercurio | ................. | 296/193.07 |

FOREIGN PATENT DOCUMENTS

| | | |
|---|---|---|
| DE | 10151482 A1 | 6/2003 |
| WO | WO-2006/090145 A1 | 8/2006 |
| WO | WO-2007/099215 A2 | 9/2007 |
| WO | WO-2008/110773 A1 | 9/2008 |

OTHER PUBLICATIONS

European Application U.S. Appl. No. EP 08425723, European Search Report completed Apr. 24, 2009, 2 pgs.

* cited by examiner

*Primary Examiner* — Glenn Dayoan
*Assistant Examiner* — Pinel Romain
(74) *Attorney, Agent, or Firm* — Schwegman Lundberg & Woessner, P.A.

(57) ABSTRACT

A raisable load shelf for a luggage compartment of a motor vehicle is provided with a panel, which defines an upper surface on which items can be placed and is provided with a handle that a user can grasp to raise or maneuver the load shelf in the luggage compartment; the load shelf has at least two appendages, which are arranged along respective edges of the panel and are hinged to the panel about respective axes parallel to the edges to rotate downwards from a horizontal position to a substantially vertical position in order to reduce a dimension of the load shelf; in the horizontal position, the appendages project horizontally with respect to the panel so as to rest, in use, on respective brackets of the luggage compartment.

25 Claims, 3 Drawing Sheets

RAISABLE LOAD SHELF FOR A LUGGAGE COMPARTMENT OF A MOTOR VEHICLE

RELATED APPLICATION

This application claims the benefit of priority, under 35 U.S.C. Section 119, to European Patent Application Serial No. 08425723.7, filed on Nov. 11, 2008, which is incorporated herein by reference in its entirety.

TECHNICAL FIELD

Various examples relate to a raisable load shelf for a luggage compartment of a motor vehicle.

BACKGROUND

Motor vehicles in which the luggage compartment is provided with a horizontal load shelf, the height of which can be adjusted between a lowered position adjacent to a floor of the luggage compartment, and a raised position to divide the luggage compartment into an upper space and a lower space are known.

In many cases, the load shelf can also be turned upwards starting from its horizontal position, by lifting the rear edge of the load shelf, to access the lower space beneath it.

In order to be held at a fixed height, the load shelf is normally provided with support members that are coupled to respective retaining devices, which are carried by the luggage compartment, in particular by the side panels, and are directly releasable by hand.

To raise the load shelf, the user must first of all release the retaining devices by hand, first from one side and then from the other side of the luggage compartment, then take hold of the load shelf to move it into the desired position, and lastly re-connect the retaining devices.

In some solutions, the side panels of the luggage compartment are provided with guides to guide the height adjustment of the load shelf, or the luggage compartment is fitted with additional frames that support the load shelf in the various positions.

The need is felt to simplify the load shelves of the known type described above, so that the load shelf can be raised more quickly and preferably using one hand.

SUMMARY

A raisable load shelf for a luggage compartment of a motor vehicle, which satisfies the above requirement in a simple and cost-effective manner and that is, preferably, not particularly bulky.

According to some examples there is provided a raisable load shelf for a luggage compartment of a motor vehicle, the load shelf including a panel defining an upper surface on which items can be placed, a hand grip portion that a user can grasp to raise or maneuver the load shelf in the luggage compartment, at least two support appendages arranged along respective edges of the panel, wherein the support appendages are hinged to the panel about respective axes parallel to the upper surface so as to rotate downwards from a horizontal position to a substantially vertical position in order to reduce a dimension of the load shelf. In some examples, in the horizontal position, the appendages project horizontally with respect to the panel so that they rest, in use, on respective brackets of the luggage compartment.

BRIEF DESCRIPTION OF THE DRAWINGS

In order to better understand the present invention, a non-limiting preferred embodiment thereof will now be described by way of example with reference to the accompanying drawings, in which.

DETAILED DESCRIPTION

Figure 1:
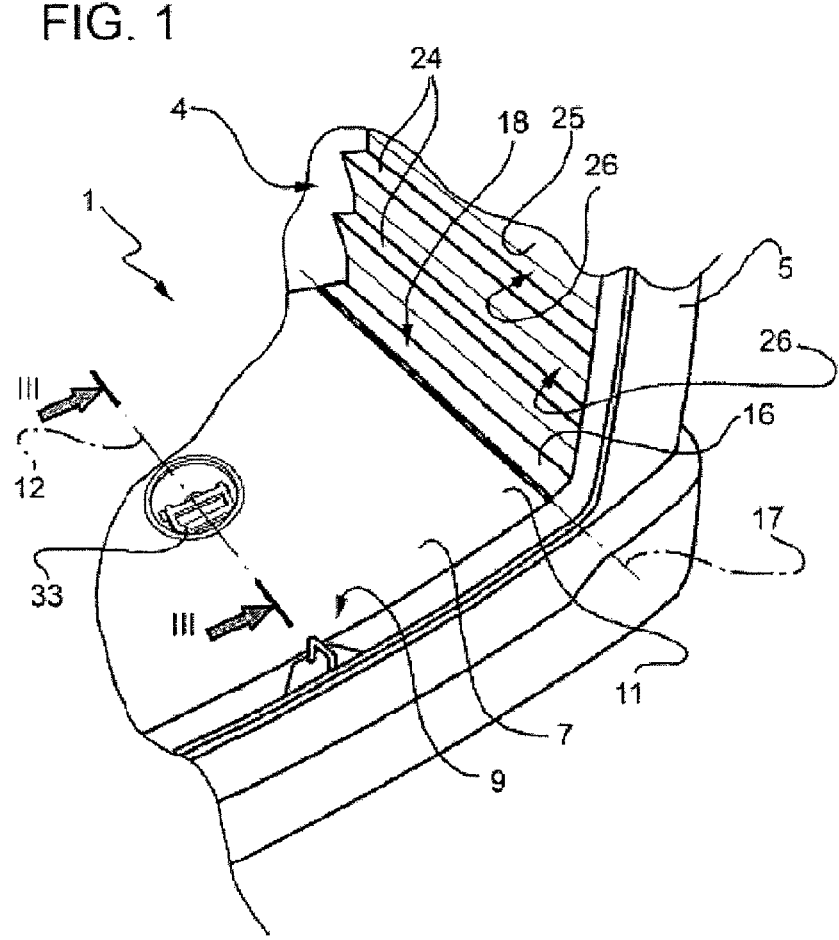
FIG. 1 is a perspective view, in which some parts have been removed for the sake of clarity, of a preferred embodiment of the raisable load shelf for a luggage compartment of a motor vehicle according to some examples.

In FIG. 1, indicated as a whole by number 1 is a raisable load shelf for a luggage compartment 4 of a motor vehicle 5 (partially illustrated). The load shelf 1 is housed entirely in the luggage compartment 4 and comprises an intermediate panel 7, which is substantially rectangular and defines an upper surface 9 on which luggage or other items can be placed.

Figure 2:
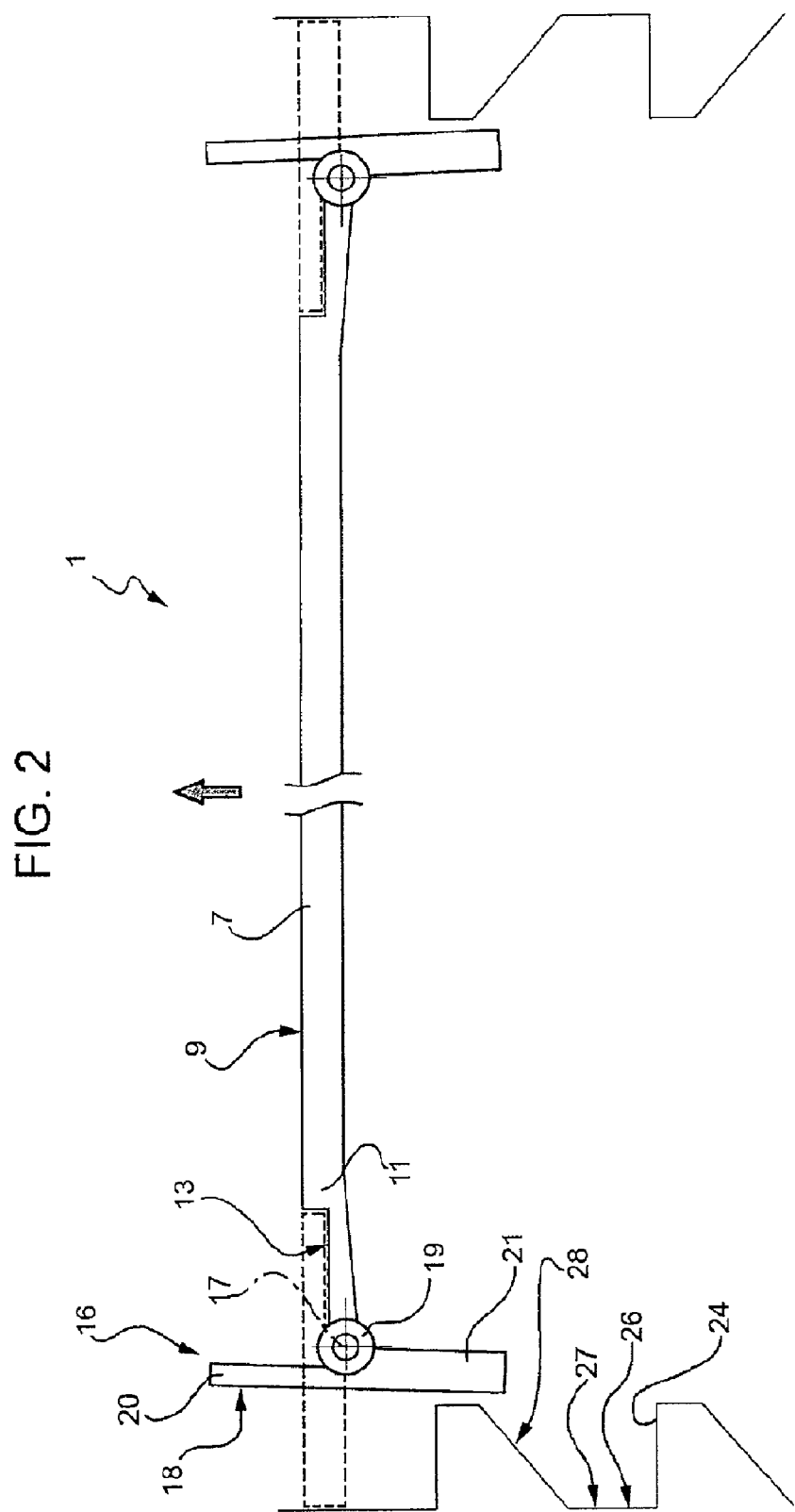
FIG. 2 is a rear view of the load shelf of FIG. 1 while being raised in the luggage compartment.

According to what shown in FIG. 2, the panel 7 terminates laterally with two edge portions 11, which are parallel to a longitudinal axis 12 on the center line of the load shelf 1 (FIG. 1) and define respective recesses 13, with respect to the surface 9, that extend for the entire length of the panel 7.

Figure 4:
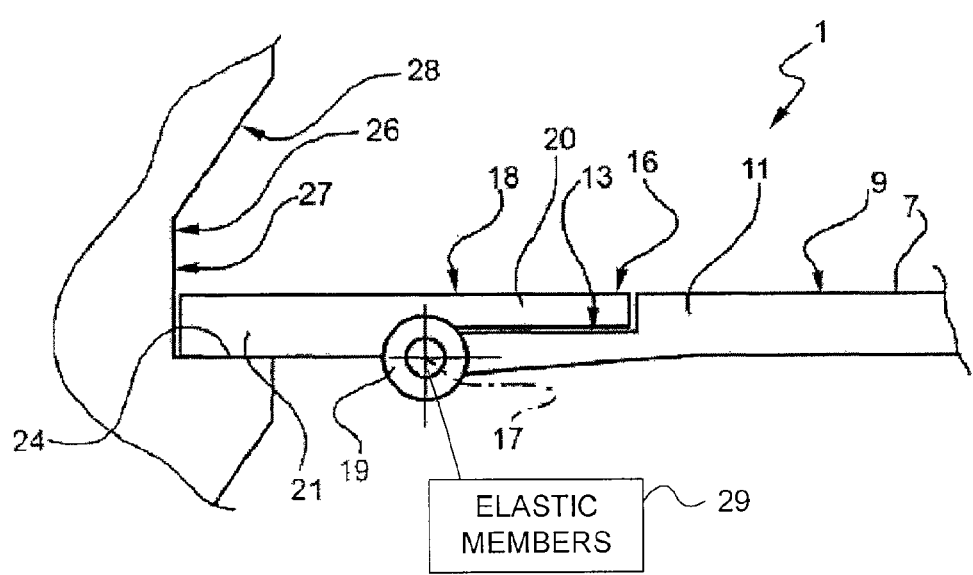
FIG. 4 is a rear view, on an enlarged scale, of a detail of the load shelf of FIG. 1.

The load shelf 1 comprises two lateral wings 16, which are hinged to the portions 11 so as to rotate about respective axes 17 parallel to the edges of the panel 7, which are in turn parallel, in particular, to the axis 12. Each wing 16 has, on one side, a flat surface 18 and, on the other side, a hinge portion 19 arranged in an intermediate position with respect to the side edges and hinged to the portion 11. The wing 16 thus defines a pair of appendages 20, 21 that are diametrically opposite with respect to the axis 17. In particular, the shape of the appendage 20 is complementary to that of the recess 13. The wings 16 are rotatable between a substantially vertical position (FIG. 2) and a horizontal position (FIG. 4). In the horizontal position, the appendages 20 engage the recess 13, the surfaces 18 are coplanar with the surface 9, and the appendages 21 project horizontally with respect to the axes 17, that is with respect to the side edges of the panel 7, to as to rest freely on respective brackets 24. In the substantially vertical position, the width of the load shelf 1 is smaller.

As illustrated in FIGS. 1 and 2, the brackets 24 are defined by side trim panels 25 of the luggage compartment 4, they are arranged at several different heights, that is they are vertically spaced, and mutually define respective seats 26 on each side panel. In particular, each seat 26 is defined laterally by a vertical surface 27 and superiorly by a surface 28, which slopes from the top downwards and from the inside towards the outside in the luggage compartment 4.

The distance in the horizontal direction between the surfaces 27 of the two side panels is substantially equal to the width of the load shelf 1 (measured between the outer edges of the appendages 21) when the wings 16 are arranged in a horizontal position resting on the brackets 24. In other words, with the wings 16 in this position, the surfaces 27 have the function of centering the load shelf 1 in the transverse direction. The load shelf 1 is positioned or held in the longitudinal direction by means of devices or shoulders that are not illustrated: for example, the wings 16 could have a particular shape with a relative seat on the side panels.

Meanwhile, the distance in the horizontal direction between the inner edges of the brackets 24 of the two side panels is greater than the width of the load shelf (measured between the surfaces 18) when the wings 16 are arranged in a substantially vertical position. Thanks to this design, the load shelf 1 can be raised between the various seats 26, that is between the various levels, without tilting the panel 7.

According to a first embodiment, the wings 16 rotate from the horizontal position to the substantially vertical position due to the greater weight of the appendages 21 with respect to that of the appendages 20. The rotation in the opposite direction is caused by acting on the appendages 20 using one hand.

According to a second and preferred embodiment, elastic members 29 are provided, in the hinges of the axes 17 or between the panel 7 and the wings 16, to maintain the wings 16 in their horizontal position. The wings 16 rotate from the horizontal position to the substantially vertical position, that is the appendages 21 rotate downwards, due to the surfaces 18 resting and rubbing against the surfaces 28 when the panel 7 is raised, maintaining the panel 7 in a substantially horizontal position. In other words, the surfaces 28 cause the appendages 21 to bend downwards. The rotation in the opposite direction is automatic, due to the effect of the elastic members 29. The load shelf 1 can thus be raised between the various seats 26 without acting on the wings 16.

When the panel 7 is being raised, once the outer edges of the appendages 21 have passed beyond the position in height of the inner edges of the brackets 24, the wings 16 automatically spring into their horizontal position, entering and engaging respective seats 26. If the seats 26 correspond to the desired level, the load shelf 1 must simply be lowered slightly so that the appendages 21 rest on the brackets 24 beyond which they have just passed. To reach the seats 26 at the next level, the panel 7 must be raised further so that the appendages 21 come into contact with the surfaces 28 above to bend the appendages 21 downwards again so that the appendages 21 spring outwards again upon reaching the seats 26 at the desired level.

According to this embodiment, to lower the load shelf 1 from an upper seat 26 to a lower seat 26, the user must tilt the load shelf 1 about the axis 12 by hand, to make it pass between the inner edges of the brackets 24.

When the wings 16 are arranged in their horizontal position, the loads on the surface 9 are discharged first by the portions 11 to the wings 16, especially through the hinges of the axes 17, and then by the appendages 21 to the brackets 24. To increase the load strength, a support member (not illustrated) of the height-adjustable type or of the removable type, could be provided underneath the panel 7.

Figure 3:
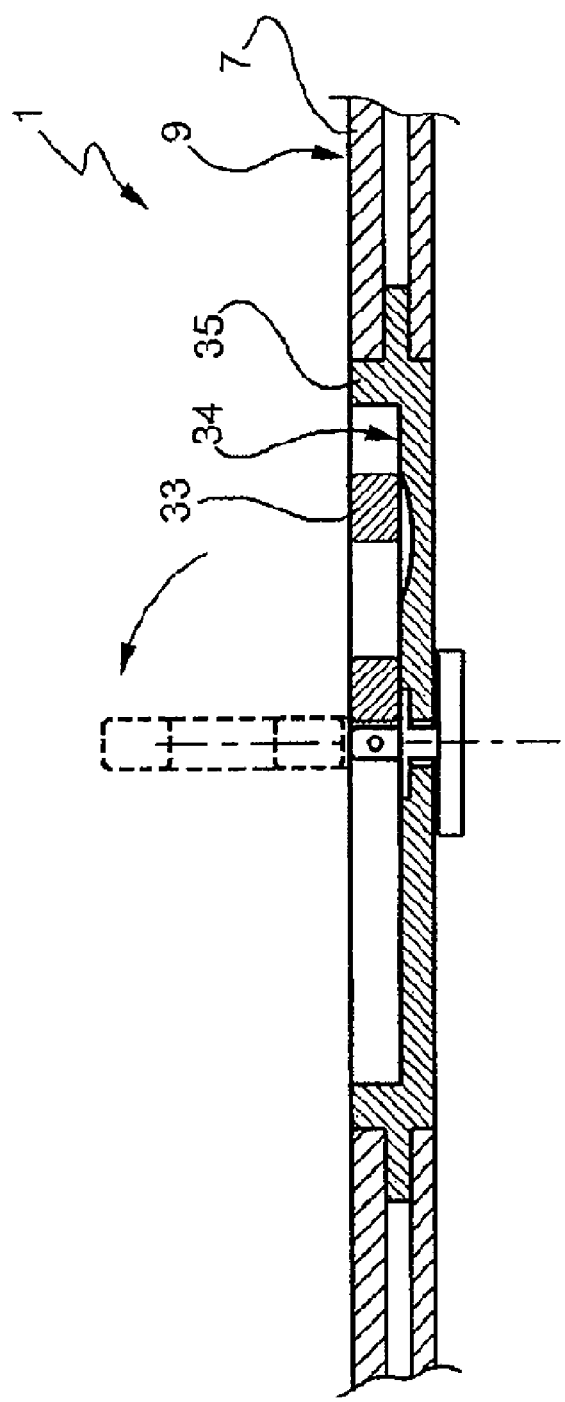
FIG. 3 is a cross-section along the line III-III of FIG. 1 and is an enlarged scale view of a hand grip portion of the load shelf of FIG. 1.

With reference to FIGS. 1 and 3, the load shelf 1 comprises a handle 33, which is provided on the panel 7, and is substantially arranged in correspondence with the center of gravity of the load shelf 1, so that the panel 7 remains substantially horizontal when raised using the handle 33.

The handle 33 is movable with respect to the panel 7 between a raised position (shown by the dashed line in FIG. 3), in which it can be grasped by a user, and a lowered position, in which it is arranged in a recess 34 below the surface 9. In particular, the handle 33 is hinged to a base 35 about an axis parallel to the surface 9 to rotate between the raised and lowered positions. Moreover, the handle 33 is rotatable with respect to the panel 7 about an axis orthogonal to the surface 9.

The weight of the luggage placed on top of the surface 9 contributes to holding the load shelf 1 in place on the brackets 24 without the need for any devices to couple it to the side panels.

When the surface 9 is not loaded with luggage or other items, the load shelf 1 should appropriately be arranged at the lowest level of the luggage compartment 4.

From the above description it is apparent that with the load shelf 1 the luggage compartment can be split in height: in particular, heavier and/or less bulky loads are arranged directly on the floor of the luggage compartment, while lighter and/or bulkier loads are arranged on the load shelf 1, that is at a higher level.

While raising the panel 7, the user does not have to release any retaining devices, as mentioned above, which makes it relatively simple to use. The rotation of the wings 16 in the downward direction, as an effect of their weight or due to the deflection of the surfaces 28, means that the width of the load shelf 1 can be automatically reduced to enable it to pass between the various levels in the luggage compartment 4.

Furthermore, in the preferred embodiment provided with elastic members 29 to return the appendages 21 to the horizontal position, the load shelf 1 can be raised and placed at the required level using just one hand. The central position of the handle 33 facilitates raising, as it enables the panel 7 to be maintained horizontal and balanced.

The load shelf 1 is a relatively compact structure, also thanks to the recess 34 for the handle 33.

Lastly it is clear that modifications and variations may be made to the load shelf 1 described and illustrated herein without departing from the scope of some examples, as set forth in the claims.

In particular, the appendages 20 could be absent or could have a different shape; and/or the wings could be arranged on the front and rear edges of the panel 7, and/or be shorter than the panel 7, and/or there could be more than two.

Moreover, the load shelf 1 could be shaped so as to be used, in addition and if necessary, as a parcel shelf, simply to hide the loads arranged beneath it in the luggage compartment. The load shelf 1 could even entirely replace a parcel shelf present in motor vehicles.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The invention claimed is:

1. A raisable load shelf for a luggage compartment of a motor vehicle, the load shelf comprising:
   a panel defining an upper surface on which items can be placed; and
   at least two support appendages arranged along respective edges of the panel, the support appendages hinged to the panel about respective axes disposed along the edges to rotate downwards from a horizontal position to a substantially vertical position, wherein in a raised panel position, with the support appendages in a horizontal position, an upper appendage surface of the appendages is substantially coplanar with the upper surface of the panel to rest on respective brackets of the luggage compartment.

2. The raisable load shelf of claim 1, wherein the support appendages are hinged to the panel about respective axes disposed along the edges to rotate downwards from a horizontal position to a substantially vertical position in order to reduce a dimension of the load shelf.

3. The raisable load shelf according to claim 1, wherein the respective axes are parallel to the edges.

4. The raisable load shelf according to claim 1, comprising a hand grip portion coupled to the shelf that a user can grasp to maneuver the load shelf in the luggage compartment.

5. The raisable load shelf according to claim 4, wherein the hand grip portion is to raise the load shelf in the luggage compartment.

6. The raisable load shelf according to claim 4, wherein the hand grip portion comprises a handle provided on the panel and arranged at the center of gravity of the load shelf.

7. The raisable load shelf according to claim 4, wherein the hand grip portion comprises a handle provided on the panel and rotatable between a raised position and a lowered position with the handle, in the lowered position, being housed in a recess below the upper surface.

8. The raisable load shelf according to claim 1, comprising elastic members to maintain the appendages in the horizontal position.

9. A system comprising:
a plurality of brackets arranged on interior side panels of a vehicle and defining a plurality of levels; and
a raisable load shelf couplable to the levels, the load shelf comprising:
a panel defining an upper surface on which items can be placed; and
at least two support appendages arranged along respective edges of the panel, the support appendages hinged to the panel about respective axes disposed along the edges to rotate downwards from a horizontal position to a substantially vertical position,
wherein in a raised panel position, with the support appendages in a horizontal position, a upper appendage surface of the appendages is substantially coplanar with the upper surface of the panel to rest on respective brackets of the luggage compartment.

10. The system of claim 9, wherein the at least two support appendages are hinged to the panel about respective axes disposed along the edges to rotate downwards from a horizontal position to a substantially vertical position to reduce a dimension of the load shelf.

11. The system of claim 9, wherein the respective axes are parallel to the edges.

12. The system of claim 9, comprising a hand grip portion coupled to the shelf that a user can grasp to maneuver the load shelf in the luggage compartment.

13. The system of claim 12, wherein the hand grip portion is to raise the load shelf in the luggage compartment.

14. The system of claim 9, wherein the appendages are to rest freely on the brackets.

15. The system of claim 9, wherein, on each side panel, the brackets mutually define respective seats, with each seat being defined laterally by a vertical surface and superiorly by a deflecting surface that slopes downwards and outwards.

16. The system of claim 9, wherein a distance in a horizontal direction between the vertical surfaces of the two side panels is substantially equal to a width of the load shelf when the appendages are arranged in a horizontal position.

17. The system of claim 9, wherein a distance in the horizontal direction between a first inner edge of a first bracket of a first side panel and a second inner edge of a second bracket of a second side panel is greater than a width of the load shelf when the appendages are arranged in a substantially vertical position.

18. A system comprising:
a plurality of brackets arranged on side panels of a vehicle and defining a plurality of levels; and
a raisable load shelf couplable to the levels, the raisable load shelf to store luggage in the vehicle, the raisable load shelf defining an upper surface on which items can be placed;
a hand grip portion coupled to the load shelf that a user can grasp to raise or maneuver the load shelf in the luggage compartment; and
at least two support appendages arranged along respective edges of the panel;
wherein the support appendages are hinged to the panel about respective axes parallel to the edges to rotate downwards from a horizontal position to a substantially vertical position in order to reduce a dimension of the load shelf, and wherein in the horizontal position, the appendages project horizontally with respect to the panel to rest on respective brackets of the luggage compartment.

19. The system of claim 18, wherein the hand grip portion comprises a handle provided on the panel and arranged at the center of gravity of the load shelf.

20. The system of claim 18, wherein, on each side panel, the brackets mutually define respective seats, with each seat being defined laterally by a vertical surface and superiorly by a deflecting surface, which slopes downwards and outwards and wherein the distance in the horizontal direction between the vertical surfaces of the two side panels is substantially equal to the width of the load shelf when the appendages are arranged in a horizontal position.

21. A system comprising:
a plurality of brackets arranged on interior side panels of a vehicle and defining a plurality of levels; and
a raisable load shelf couplable to the levels, the load shelf comprising:
a panel defining an upper surface on which items can be placed; and
at least two support appendages arranged along respective edges of the panel, the support appendages hinged to the panel about respective axes disposed along the edges to rotate downwards from a horizontal position to a substantially vertical position,
wherein in the horizontal position, the appendages project horizontally with respect to the panel to rest on the plurality brackets, and
wherein the at least two support appendages are hinged to the panel about respective axes disposed along the edges to rotate downwards from a horizontal position to a substantially vertical position to reduce a dimension of the load shelf.

22. A system comprising:
a plurality of brackets arranged on interior side panels of a vehicle and defining a plurality of levels; and
a raisable load shelf couplable to the levels, the load shelf comprising:

a panel defining an upper surface on which items can be placed; and at least two support appendages arranged along respective edges of the panel, the support appendages hinged to the panel about respective axes disposed along the edges to rotate downwards from a horizontal position to a substantially vertical position, wherein in the horizontal position, the appendages project horizontally with respect to the panel to rest on the plurality brackets, and wherein the appendages are to rest freely on the brackets.

23. A system comprising:

a plurality of brackets arranged on interior side panels of a vehicle and defining a plurality of levels; and a raisable load shelf couplable to the levels, the load shelf comprising:

a panel defining an upper surface on which items can be placed; and at least two support appendages arranged along respective edges of the panel, the support appendages hinged to the panel about respective axes disposed along the edges to rotate downwards from a horizontal position to a substantially vertical position, wherein in the horizontal position, the appendages project horizontally with respect to the panel to rest on the plurality brackets, and wherein, on each side panel, the brackets mutually define respective seats, with each seat being defined laterally by a vertical surface and superiorly by a deflecting surface that slopes downwards and outwards.

24. A system comprising:

a plurality of brackets arranged on interior side panels of a vehicle and defining a plurality of levels; and a raisable load shelf couplable to the levels, the load shelf comprising:

a panel defining an upper surface on which items can be placed; and at least two support appendages arranged along respective edges of the panel, the support appendages hinged to the panel about respective axes disposed along the edges to rotate downwards from a horizontal position to a substantially vertical position, wherein in the horizontal position, the appendages project horizontally with respect to the panel to rest on the plurality brackets, and wherein a distance in a horizontal direction between the vertical surfaces of the two side panels is substantially equal to a width of the load shelf when the appendages are arranged in a horizontal position.

25. A system comprising:

a plurality of brackets arranged on interior side panels of a vehicle and defining a plurality of levels; and a raisable load shelf couplable to the levels, the load shelf comprising:

a panel defining an upper surface on which items can be placed; and at least two support appendages arranged along respective edges of the panel, the support appendages hinged to the panel about respective axes disposed along the edges to rotate downwards from a horizontal position to a substantially vertical position, wherein in the horizontal position, the appendages project horizontally with respect to the panel to rest on the plurality brackets, and wherein a distance in the horizontal direction between the inner edges of the brackets of the two side panels is greater than a width of the load shelf when the appendages are arranged in a substantially vertical position.

* * * * *